United States Patent [19]

Curp

[11] 4,045,147
[45] Aug. 30, 1977

[54] TILTABLE WIND MACHINE FOR USE ON VARIABLE TERRAIN

[75] Inventor: Russell W. Curp, Newhall, Calif.

[73] Assignee: SSP Agricultural Equipment, Inc., Visalia, Calif.

[21] Appl. No.: 684,550

[22] Filed: May 10, 1976

[51] Int. Cl.² .............................................. F04D 29/32
[52] U.S. Cl. .................................. 416/100; 416/110; 416/116
[58] Field of Search ............... 416/110, 100, 171, 113, 416/116

[56] References Cited

U.S. PATENT DOCUMENTS

| 322,862 | 7/1885 | Starr | 416/113 |
|---|---|---|---|
| 1,903,615 | 4/1933 | Towt | 416/110 X |
| 2,313,481 | 3/1943 | Rendano | 416/100 |
| 2,481,702 | 9/1949 | Towt | 416/110 X |
| 2,653,482 | 9/1953 | Kinder | 416/100 X |
| 3,072,321 | 1/1963 | King | 416/100 X |
| 3,180,570 | 4/1965 | Grabowski | 416/110 |
| 3,288,358 | 11/1966 | Coles | 416/110 |
| 3,547,556 | 12/1970 | Keene | 416/110 |
| 3,846,042 | 11/1974 | Keene | 416/110 |

FOREIGN PATENT DOCUMENTS

| 943,372 | 5/1956 | Germany | 416/100 |
|---|---|---|---|
| 1,032,466 | 6/1958 | Germany | 416/100 |
| 23,258 | 10/1969 | Japan | 416/100 |

*Primary Examiner*—Everette A. Powell, Jr.
*Attorney, Agent, or Firm*—Huebner & Worrel

[57] ABSTRACT

A rotatable and tiltable wind machine for protection of agricultural growth, the machine being adapted for installation on a selected terrain having a varying contour. The machine includes means for mounting on the terrain, a fan drive assembly on the mounting means rotatable with respect thereto, drive means to rotate the fan and the fan drive assembly, and tilting means for tilting the fan with respect to the mounting means and the terrain while the fan drive assembly is being rotated.

12 Claims, 7 Drawing Figures

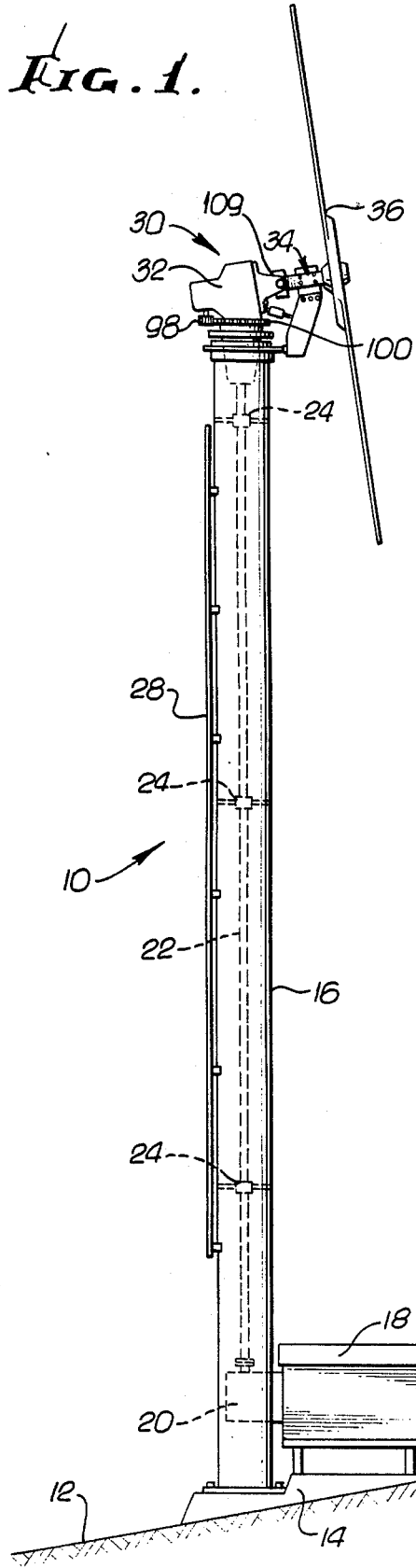
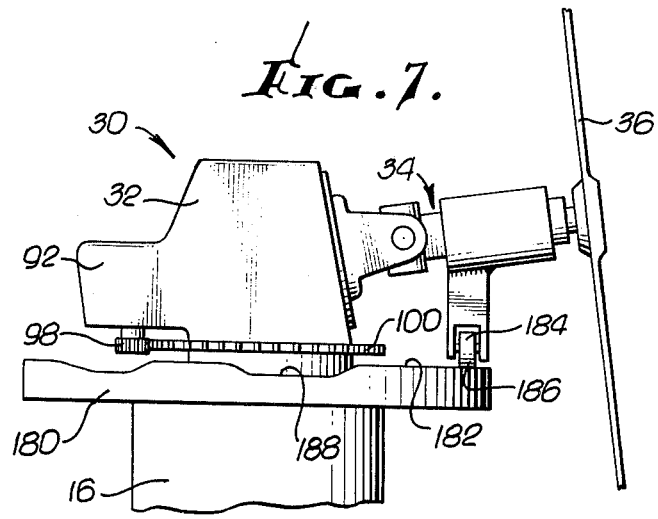
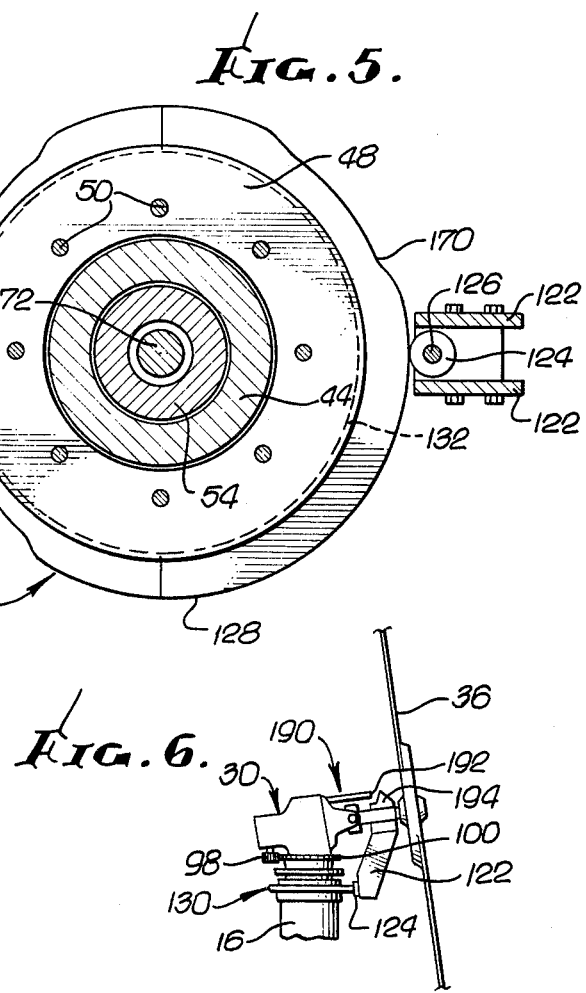

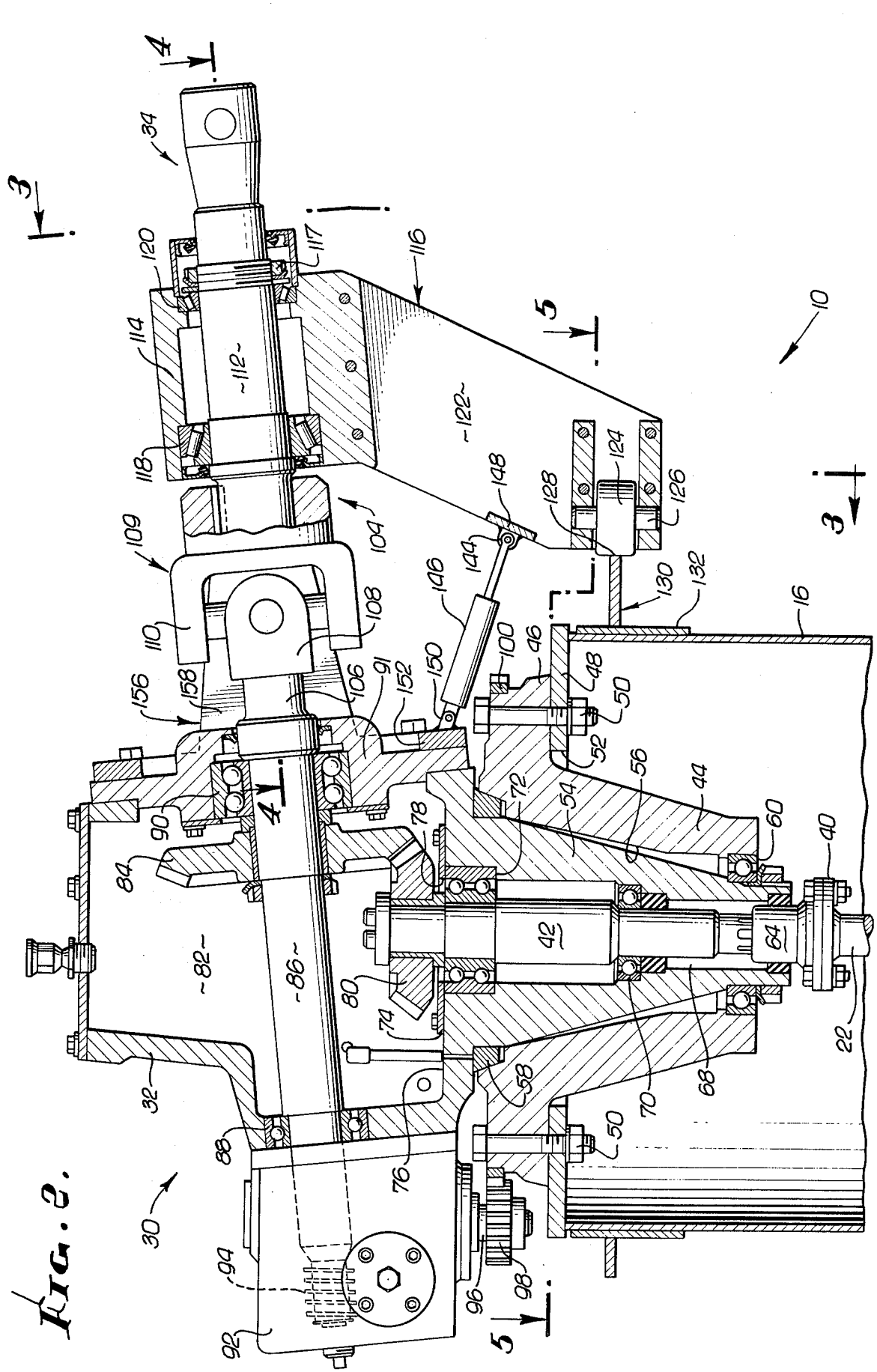

TILTABLE WIND MACHINE FOR USE ON VARIABLE TERRAIN

BACKGROUND OF THE INVENTION

The invention relates to wind machines used for protection of citrus and avocado trees and other growth and crops against damage from cold or other climatic conditions. In some situations, a disturbance of the ambient air by forced air flow from the wind machine will suffice to dissipate the harmful effect of quiescent pockets or blankets of cold air which settle over, around and under trees and plants. Under extreme conditions, heating of some of this circulated air is required.

When the area to be serviced is generally flat land, the wind machine may be supported on a column or tower and the axis of the fan is usually disposed so as to direct the flow of air downward at an angle approximately 6° below the horizontal in order to blow the air over all of the land at the proper height. The fan drive assembly is adapted to be slowly rotated through an arc of 360° or less about a vertical axis so that a machine will operate over an extended area. The rotation of the fan drive assembly through a 360° arc is at the rate of about 4½ minutes per rotation.

Where the terrain is irregular and plantings are made on hillsides and rolling slopes, a special problem is presented in that the wind machines in order to be effective must cause the air flow to be at substantially the same height relative to the terrain as would prevail if the land were flat. Thus, if an ordinary wind machine were standing vertically on a slope, and were rotated with the fan shaft at a constant angle relative to the axis of rotation, the air flow directed over the descending terrain would flow too high and the air flow over the ascending terrain would be too low.

In the prior art tiltable wind machines have been used, but they required the tilting of the entire fan drive assembly and the driving means along with a supporting platform, all positioned on the top of a tower. The present invention provides an improvement over such wind machines in that only an outer portion of the fan shaft and the fan are tilted with respect to the terrain as the entire fan assembly is rotated.

SUMMARY OF THE INVENTION

It is an object of the present invention to provide an improved wind machine for use on a terrain area having a varying contour. The machine is adapted to compensate for the descending and ascending sections of the terrain whereby the air flow descends from the machine when the fan is blowing toward the descending sections of the terrain and ascends when the fan is blowing toward the ascending sections. The rotatable wind machine thus maintains an air flow over a varying contour at a constant angle from the terrain as the fan drive assembly of the machine is rotated.

Another object of the invention is to provide a wind machine, as described in the preceding paragraph, in which the tilting of the fan with respect to the terrain is controlled by a cam having a configuration determined by the specific varying contour of the terrain.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an elevational view of a wind machine according to the invention mounted on a sloping terrain;

FIG. 2 is a cross-sectional view of the fan drive assembly of the wind machine shown in FIG. 1;

FIG. 5 is a plan view of a cam and cam follower, taken along the lines 5—5 in FIG. 2;

FIG. 6 is a fragmentary view of another embodiment of the invention; and

FIG. 7 is a fragmentary view of still another embodiment of the invention.

DESCRIPTION OF THE PREFERRED EMBODIMENTS

Figure 3:
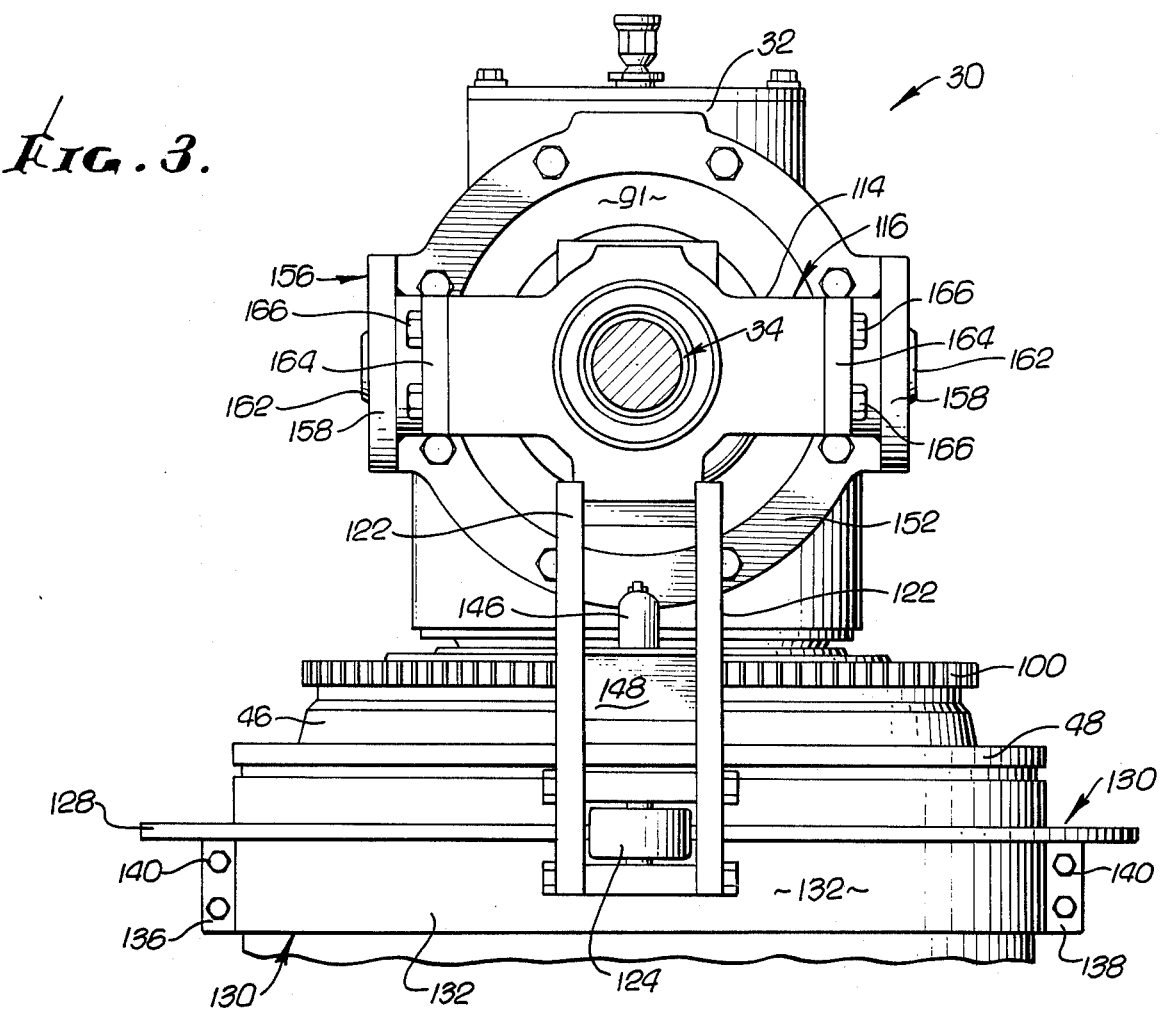
FIG. 3 is an end view of the fan drive assembly, taken along the lines 3—3 in FIG. 2.

Referring again to the drawings, there is shown in FIG. 1 a wind machine, generally designated as 10, mounted at a portion of a terrain area 12 having a variable contour. The wind machine is positioned centrally on the area on which it is to be effective. The mounting is comprised of an embedded concrete block 14 on which is secured a hollow, cylindrical tower 16. The wind machine is driven by a power source 18 which may be an electric motor or an internal combustion engine. Connected to the power source is a reduction gear box 20, and upwardly extending therefrom is a vertical driving shaft 22 which rotates at a reduced speed relative to the motor 18. The driving shaft rotates within bearings 24 centrally positioned within the tower and supported therein. Fixed to the tower is a ladder 28 to provide access to a fan drive assembly, generally designated as 30, secured for rotation at the top of the tower. The fan drive assembly is comprised of a housing or fan drive housing 32, a fan shaft assembly 34 and a fan assembly 36.

In FIG. 2 the fan drive assembly is shown in detail. Connected to the shaft 22 by means of a coupling 40 is a vertical shaft portion 42 extending through a fixed fan drive assembly mounting means or yoke 44. The mounting means 44 is generally conical, tapering downwardly, and at its upper end has an annular flange 46, secured to an annular plate 48 by means of bolts 50. The plate 48 is secured to the top of the tower 16 and has a central opening 52 through which the mounting means 44 extends.

At the lower end of the fan drive assembly is a conical support member or hub 54, complementary in configuration to a generally inner conical surface 56 of the yoke 44. The hub 54 is bearing mounted for rotation on annular bearings 58 and 60.

The shaft portion 42 is splined or otherwise secured to a member 64 of the coupling 40, and extends through a central opening 68 of the hub 54. The shaft portion 42 is also mounted in bearings 70 and 72 secured within the central opening 68. The bearings 72 are secured in place by an annular plate 74 mounted on surface 76 at the top of the member 54. The plate 74 has a central opening 78 through which the shaft portion 42 extends.

Mounted on the shaft portion 42 within an oil reservoir 82 of the fan drive housing is a bevel gear 80 supported by bearing 72. Engaged with the bevel gear 80 is a complementary bevel gear 84 mounted on an inner portion 86 of the fan shaft assembly 34. The inner shaft portion 86 is mounted for rotation within the housing on bearings 88 and 90, the latter being secured within oil reservoir closure plate 91.

To the left, and outwardly of the oil reservoir, the inner shaft 86 extends into a reduction gear box 92. At the end of the shaft within the box 92 is a worm gear 94 engaged to reduction gears, not shown, and from which extend downwardly a shaft 96 on which there is secured a pinion 98. The pinion 98 is engaged with a fixed ring gear 100 secured on the circumferential edge of the flange 46, also shown in FIGS. 1 and 3. Rotation of the pinion 98 on the ring gear 100 causes the fan drive assembly to rotate 360° to direct the forced air over the terrain surrounding the tower.

To the right of the housing 32 extends an intermediate portion, generally designated as 104, of the shaft assembly 34. The intermediate portion 104 is comprised of an extension 106 of the portion 86, connected to one end 108 of a heavy duty universal joint 109, the other end 110 of the universal joint being connected to an outer shaft portion 112 of the shaft assembly 34. The universal joint permits portion 112 to be tilted upwardly and downwardly with respect to the fan drive housing. The fan assembly 36, as shown in FIG. 1, is secured on the outer end portion 112.

As shown in FIGS. 2-5, the outer shaft portion 112 is supported within a housing 114 of a shaft tilting member, generally designated as 116, on bearings 118 and 120 for rotation therein. The shaft is secured in the hub by locking nut 117. Extending downwardly from the housing 114 are follower arms 122, having mounted on their lower ends a cam follower or roller 124 rotatable on a generally vertical shaft 126. In the preferred embodiment the roller 124 is adapted to follow a generally vertical cam surface 128 on a radial, generally annular two part cam 130, preferably secured to the outer cylindrical surface of the tower 16 by at least one clamping member 132. As best seen in FIGS. 3 and 5, there is illustrated two clamping members 132 and 134 which are joined at their ends by radially directed flanges 136 and 138, and they are secured on the tower 16 by means of bolts 140, the flanges being in abutment so there is effectively no interruption of the cam surface 128. This arrangement permits the cam, specific to a particular terrain, to be positioned relative to the terrain during installation of the machine.

While two clamping members 132 and 134 are illustrated, it should be realized that a single clamping member and a hinge means on the cam may be used without departing from the spirit of the invention.

One end 144 of a shock absorber 146 is pivotally mounted on a plate 148 secured to the follower arms 122 and the other end 150 of the shock absorber is pivotally mounted to a ring face plate 152 on the closure 91. The shock absorber may limit the upper tilting movement of the shaft portion 112 and the fan assembly and dampens any surging movement which may occur in the fan shaft.

Figure 4:
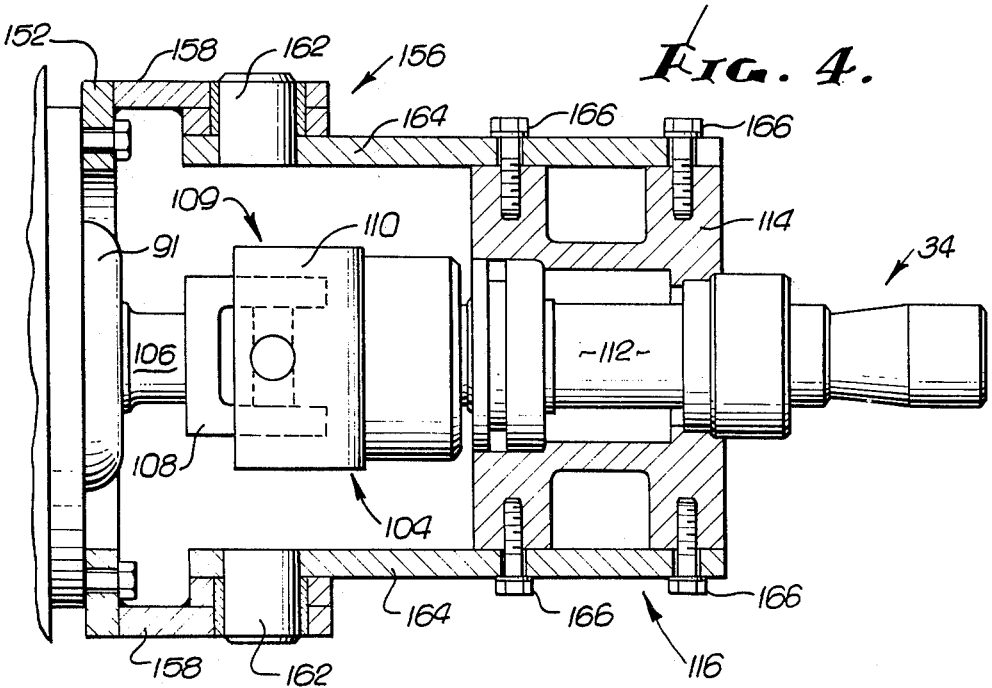
FIG. 4 is a fragmentary partially cross-sectional plan view of the fan drive assembly, taken along the lines 4—4 in FIG. 2.

As shown in FIGS. 3 and 4, additional support means, generally designated as 156, are provided to support the outer shaft portion 112 and to restrict the universal joint and the fan assembly against lateral movement. The support is comprised of two diametrically spaced trunion arms 158 mounted on ring 152. Adjacent their outer ends, the trunion arms have cylindrical openings for supporting pivot pins 162, secured adjacent one end of arms 164 which are secured at their other ends to shaft housing 114 by means of bolts 166. Thus, when the fan assembly and shaft portion 112 are moved upwardly and downwardly, the pivot pins 162 rotate in the trunion arms 158.

In FIG. 5 the cam surface 128 is shown in detail. For the point where the roller is in contact with the cam, the shaft portion 112 and the fan assembly are tilted upwardly a maximum amount in accordance with the lowest portion of the terrain. When other areas of the cam, such as 170, are engaged by the cam follower, the fan assembly is tilted downwardly with respect to higher areas of the terrain for which the cam is specifically made. Similarly, at point 172 the fan assembly is tilted downwardly its maximum amount to cause the air stream to be directed toward the higher part of the land at the same angle it is directed to the surface of all the other contour variations.

From appropriate data based upon appropriate topographic surveys the cam surface 128 may be determined. The cam is then secured to the tower by means of the clamping members 132, 134 and positioned so that when the fan assembly is rotated by the pinion 98 engaged with the ring gear 100 the fan will produce an air stream at an appropriate angle with respect to the varying land contour.

In FIG. 7 another embodiment of the invention is shown in which a vertical cam 180 has a generally horizontal cam surface 182 derived in the same way as the cam surface 128. In this embodiment the cam follower roller 184 has a generally horizontal axis. As shown, at point 186 on the cam the fan assembly is tilted to its highest position and is lowered, tilting downwardly, when the cam follower is moved so that the cam follower rides on point 188, for example.

In FIG. 6, having the same cam as shown in FIG. 5, a different type of tilting limiting means 190 is shown. It is formed of a metal strut and has a plate at its outer end 192 which is adapted to make contact with an extension 194 on the fan shaft housing. Thus, when the fan shaft housing is moved to an upper position to make contact with the strut, it is thereby limited in its upper movement. The upper limit is to prevent the fan from being moved upwardly to a position where it might be damaged.

In operation, the engine or motor is started and the fan is caused to rotate at about 590 RPM. The rotation of the fan shaft causes the pinion 98 to rotate on the ring gear 100 so as to rotate the fan drive assembly on the tower at the rate of about 4½ minutes per rotation. As the fan drive assembly rotates, the cam follower follows the cam surface causing the fan assembly to be tilted upwardly and downwardly in accordance with the terrain variation. As shown in FIG. 1, the cam follower 124 is on a high point on the cam causing the fan assembly to have been tilted upwardly so that the air flow from the fan is directed downwardly to the proper angle with respect to the terrain. As the cam follower continues to rotate with respect to the cam, it moves to cam surfaces which causes the fan to be tilted to direct the air flow at the proper angle with respect to the terrain for all points through the 360° rotation of the fan drive assembly.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:

1. In a rotatable and variably tiltable wind machine for protection of agricultural growth, the wind machine being adapted for installation on a selected terrain having a varying surface contour 360° or less around the machine, mounting means for securing the machine on the terrain, a fan drive assembly mounted for rotation on and with respect to said mounting means, said rotation being about a generally vertical axis of the mounting means, the fan drive assembly including a fan, a fan housing, and a fan shaft, drive means associated with the mounting means to rotate the fan and the fan drive assembly, the rotation of the fan being on an axis generally transverse to said vertical axis, the improvement comprising:

tilting means associated with the mounting means and the fan for variably tilting the fan with respect to said fan housing and the terrain while the fan drive assembly is being rotated, and means forming a part of said fan shaft to permit the fan to be tilted with respect to the housing.

2. The invention according to claim 1 in which:

said fan shaft is formed of three parts, an inner shaft part being within the housing and engaged with the drive means, an outer shaft part being outwardly of said housing and connected directly to the fan, and an intermediate shaft part connecting the inner and outer parts, said means forming a part of said fan shaft to permit the fan to be tilted with respect to the housing being a universal joint in said intermediate shaft part.

3. The invention according to claim 2 in which:

said tilting means includes fan support means adapted to rotate with the fan drive assembly, said support means being engaged adjacent one end thereof with said outer shaft part, said support means having its other end in contact with variable surface means adjustably fixed on said mounting means, whereby rotation of the support means with respect to the surface means tilts the fan in accordance with the surface variations.

4. The invention according to claim 3 including:

upward tilt limiting means associated with said housing and said support means to prevent excessive upward tilting of the fan.

5. The invention according to claim 4 in which:

said tilt limiting means is a shock absorber having one end connected to said housing and having its other end connected to said support means.

6. The invention according to claim 3 in which:

said variable surface means is an annular cam on said mounting means and said other end of said support means is a cam follower.

7. The invention according to claim 3 in which:

said support means supports said outer shaft part on bearings adjacent said one end so that the outer shaft part rotates on said bearings.

8. The invention according to claim 7 in which:

said support means has transverse arms extending along the shaft outwardly of said housing pivotally connecting said housing and said one end, said pivot being in alignment with said universal joint, said transverse arms being adapted to restrict the universal joint and the fan against lateral movement.

9. The invention according to claim 1 in which:

said fan shaft is formed of three parts, an inner shaft part being within the housing and engaged with the drive means, an outer shaft part being outwardly of said housing and connected directly to the fan, and an intermediate shaft part connecting the inner and outer parts, said means forming a part of said fan shaft to permit the fan to be tilted with respect to the housing being a universal joint in said intermediate shaft part;

said tilting means including support means adapted to rotate with said fan drive assembly, said tilting means being engaged adjacent one end thereof with said outer shaft part;

a cam follower on the other end of said support means in contact with an annular cam fitted on said mounting means, said cam having a surface varied in accordance with the terrain, whereby rotation of the support means tilts the fan according to the cam surface variations in accordance with the surface variations; and upward tilt limiting means associated with means on said mounting means and associated with said fan to prevent excessive upward tilting of the fan, said support means supporting said outer shaft part on bearings adjacent said one end of said support means so that the outer shaft part rotates on said bearings.

10. The invention according to claim 9 in which:

said cam surface extends generally vertically and said cam follower is a roller having a generally vertical axis.

11. The invention according to claim 9 in which:

said cam surface extends generally horizontally and said cam follower is a roller having a generally horizontal axis.

12. The invention according to claim 9 in which:

said support means has transverse arms extending along said shaft outwardly of said housing pivotally connecting said housing and said one end, said pivot being in alignment with said universal joint, said transverse arms being adapted to restrict the universal joint and the fan against lateral movement.

* * * * *